(12) United States Patent
Tiemann

(10) Patent No.: US 6,417,671 B1
(45) Date of Patent: Jul. 9, 2002

(54) ARC FAULT CIRCUIT BREAKER APPARATUS AND RELATED METHODS

(75) Inventor: Jerome J. Tiemann, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/707,405

(22) Filed: Nov. 7, 2000

(51) Int. Cl.[7] .......................... G01R 31/08; H02H 3/28
(52) U.S. Cl. ............................ 324/509; 324/536; 361/42
(58) Field of Search ............................. 324/536, 117 H, 324/509, 524; 361/42, 44

(56) References Cited

U.S. PATENT DOCUMENTS

| | | | |
|---|---|---|---|
| 3,963,963 A | * | 6/1976 | Schade, Jr. .................. 361/44 |
| 5,250,894 A | * | 10/1993 | Bridges et al. .......... 324/117 H |
| 5,459,630 A | * | 10/1995 | MacKenzie et al. ........ 324/520 |
| 5,682,101 A | * | 10/1997 | Brooks et al. ............... 324/520 |
| 5,933,012 A | * | 8/1999 | Bengtsson et al. .......... 324/524 |
| 6,031,699 A | | 2/2000 | Dollar, II et al. |
| 6,088,205 A | | 7/2000 | Neiger et al. |
| 6,195,241 B1 | | 2/2001 | Brooks et al. |
| 6,229,679 B1 | | 5/2001 | Macbeth |
| 6,239,962 B1 | | 5/2001 | Seymour et al. |
| 6,259,996 B1 | | 7/2001 | Haun et al. |
| 6,262,871 B1 | | 7/2001 | Nemir et al. |
| 6,275,044 B1 | | 8/2001 | Scott |

* cited by examiner

Primary Examiner—N. Le
Assistant Examiner—Vincent Q. Nguyen
(74) Attorney, Agent, or Firm—Armstrong Teasdale LLP

(57) ABSTRACT

A circuit for detecting arc faults and over-currents includes two overcurrent detection circuits and a ground fault circuit referenced to a single ground and configured to receive power from a single power supply. Each over-current detection circuit includes a Hall effect current sensor configured to determine a current in a corresponding pole conductor. A method for detecting arc faults and over-currents includes determining a current in a pole conductor using a sensor not in contact with the pole conductor. This circuit and method allow a two-pole breaker circuit to be configured in a form similar to a one-pole circuit and eliminate tripping caused by spurious signals from bimetal sensors.

19 Claims, 2 Drawing Sheets

ARC FAULT CIRCUIT BREAKER APPARATUS AND RELATED METHODS

BACKGROUND OF THE INVENTION

This invention relates generally to circuit breakers and more particularly to arc fault detecting circuit interrupters.

An arc fault circuit interrupter protects against electrical discharge characterized by low and erratic current resulting, for example, from a damaged extension cord or an improperly installed wall receptacle. Arc fault interrupters are commonly configured in one-pole and two-pole circuits that utilize current transformers and current sensors to detect arc faults and over-currents. When such a hazard is detected, a trip device is activated to open the circuit.

Bimetal thermal trip devices typically include a bimetal current sensor in a two-pole circuit breaker. A ground fault detecting current transformer is associated with one of the two poles. If the breaker trips when no power is sensed on a side of the current transformer, and if the bimetal current sensor is at a potential equal to that of the pole conductor associated with the transformer, a large spurious signal may enter an over-current sensor circuit and cause the breaker to work incorrectly.

One-pole arc fault circuits have been adapted to two-pole breaker circuit configurations. Such circuits typically are complex, particularly where powered from a pole not associated with the transformer. Thus, for example, one known two-pole configuration references three separate ground potentials and includes two opto-couplers. A ground reference for each over-current sensor is referenced to the bimetal resistor at its associated pole potential, and power for each sensor circuit is derived from a neutral conductor. The trip circuit contains a ground leakage detection circuit and is powered by a full-wave power supply. Over-current trip signals are relayed to the trip circuit by the two opto-couplers. As the above described circuit illustrates, prevention of spurious trip signals has entailed additional power supply circuitry and use of opto-couplers or other devices capable of transferring a signal across high voltages.

BRIEF SUMMARY OF THE INVENTION

In an exemplary embodiment, a circuit for detecting arc faults and over-currents includes a ground fault circuit and two over-current detection circuits. Each over-current detection circuit includes a Hall effect current sensor configured to determine a current in a corresponding pole conductor. The ground fault and over-current detection circuits are referenced to a single ground and configured to receive power from a single power supply. In operation, a current signal is sensed by a Hall effect sensor with reference to the single ground and without a metallic connection between the sensor and the pole conductor.

The above described circuit allows a two-pole breaker circuit to be configured in a form similar to a one-pole circuit and also eliminates tripping caused by spurious signals from bimetal sensors.

DETAILED DESCRIPTION OF THE INVENTION

Figure 1:
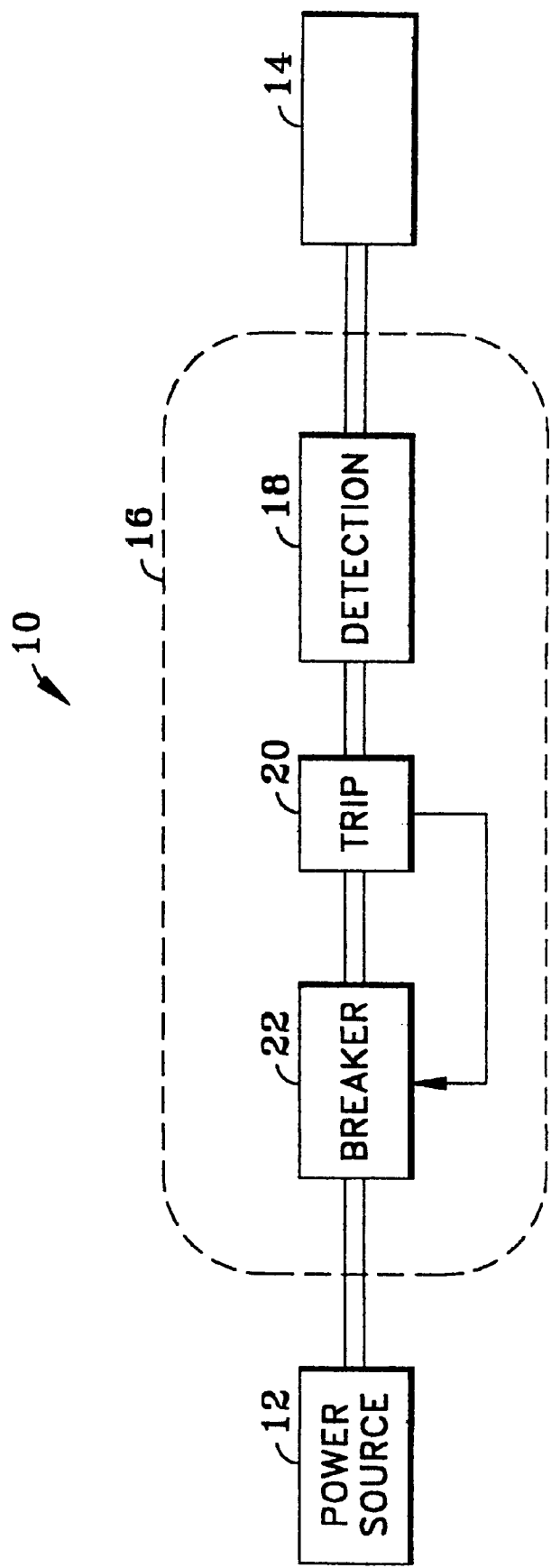
FIG. 1 is a diagram of an electrical power circuit utilizing a breaker circuit.

FIG. 1 illustrates a typical electrical power circuit or system 10 for distributing power from a power source 12 to e.g. machinery or appliances 14 in a residence or other location. A breaker circuit 16 is utilized to protect against arc faults and over-currents in e.g. wiring or outlets associated with use of appliances 14. Breaker circuit 16 includes a detection circuit 18, a trip device or circuit 20 and a breaker 22. When circuit 18 detects an arc fault or over-current, it signals trip device 20. Trip device 20 triggers breaker 22, which breaks an electrical connection between power source 12 and appliances 14. Power circuit 10 as shown in FIG. 1 is exemplary only, and embodiments of the present invention are practiced in connection with many other power circuit configurations.

Figure 2:
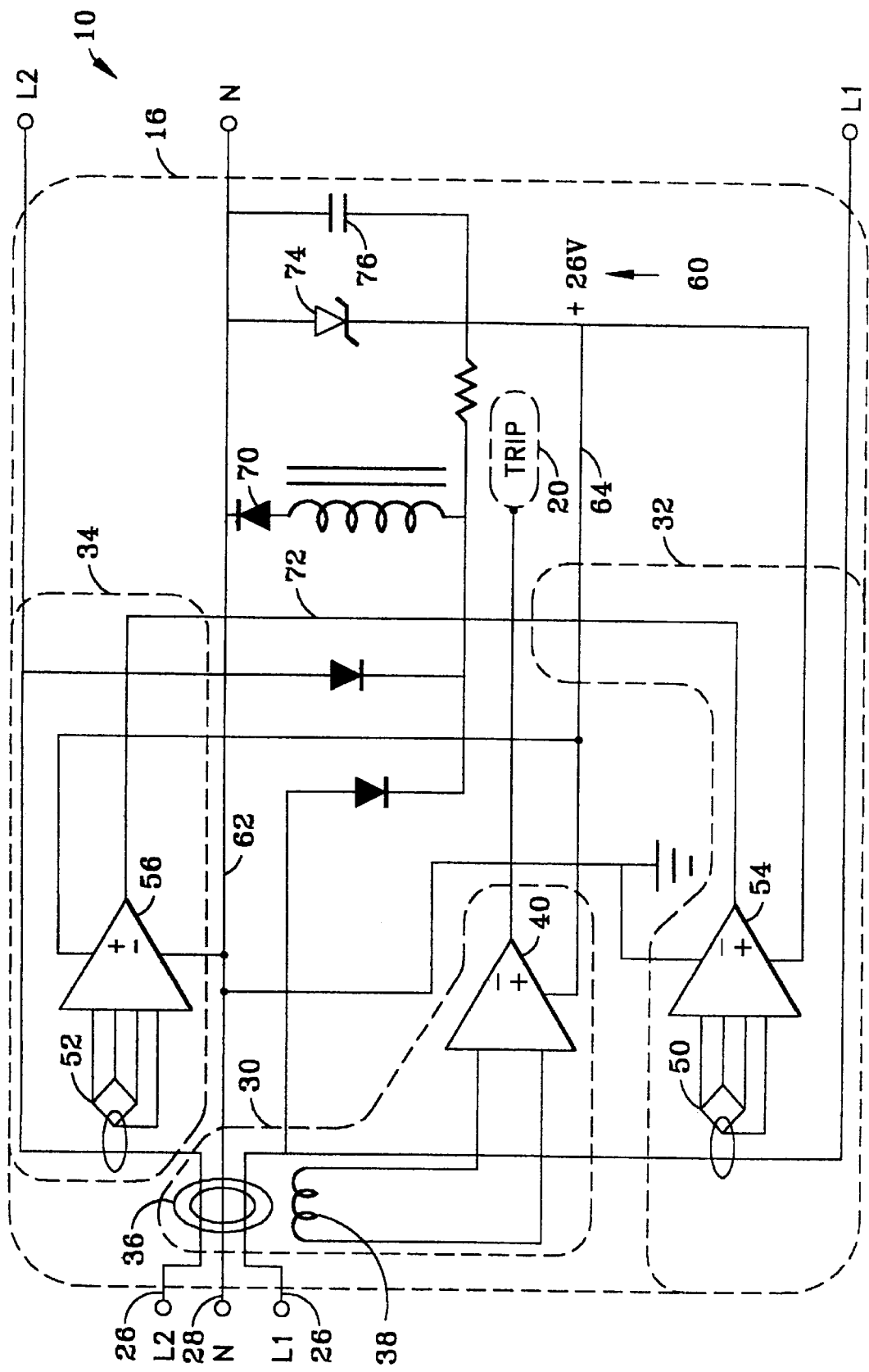
FIG. 2 is a circuit diagram of a two-pole arc fault breaker circuit.

Referring to FIG. 2, system 10 includes a plurality of pole conductors 26, e.g. two conductors L1 and L2, and a neutral conductor 28. Circuit 16 for detecting arc faults and over-currents includes a ground fault detection circuit 30 and two over-current detection circuits 32 and 34. Ground fault detection circuit 30 includes a current transformer 36 surrounding pole conductors 26 and neutral conductor 28. A sensor coil 38 receives a signal from transformer 36 representing a differential value of combined currents through conductors 26 and 28. An operational amplifier 40 passes the sensed signal to trip circuit 20, which trips breaker 22 (shown in FIG. 1) for circuit 10 if the amplified signal reaches a predetermined trip magnitude.

Over-current detection circuit 32 includes a Hall effect semiconductor current sensor 50 corresponding to a pole conductor 26, e.g. L1. Similarly, over-current detection circuit 34 includes a Hall effect semiconductor current sensor 52 corresponding e.g. to pole conductor L2. No metallic connections exist between sensors 50 and 52 and respective corresponding pole conductors 26. Sensors 50 and 52 are electrically connected via operational amplifiers 54 and 56 to trip circuit 20.

Ground fault detection circuit 30 and over-current detection circuits 32 and 34 each receive power from a single power supply 60, e.g. a full wave power supply of 26 volts DC. Circuits 30, 32 and 34 also are referenced to a single analog ground potential, e.g. to a potential of neutral line 28 in the embodiment shown in FIG. 2. Thus, in the embodiment shown in FIG. 2, a negative rail 62 of power supply 60 is at a neutral potential while a positive rail 64 of power supply 60 supplies power to circuits 30, 32 and 34.

In operation, sensors 50 and 52 sense current signals in pole conductors L1 and L2 respectively. Operational amplifiers 54 and 56 pass the signals sensed respectively by sensors 50 and 52 to trip circuit 20, which trips breaker 22 (shown in FIG. 1) for circuit 10 if the amplified signal reaches a predetermined trip magnitude. Because there is no metallic connection and very little capacitance between a Hall effect sensor and a conductor from which current is being sensed, sensor circuits 32 and 34 receive very little spurious signal.

A solenoid 70 referenced to a line 72 connecting sensor circuits 32 and 34 activates trip circuit 20 when a combination of clipped signals from pole conductors 26 exceed a predetermined trip magnitude. A Zener diode 74 and a capacitor 76 clamp the voltage difference between power supply 60 and neutral conductor 28 at e.g. 26 volts.

Other configurations are within the scope of the present invention. For example, in another embodiment in which two additional diodes are utilized, a full wave bridge power supply is used with a negative rail utilized as an analog ground. Such an embodiment responds to a fault during a first half-cycle after the fault has become detectable. In yet another embodiment, a half-wave bridge power supply is used in which a positive rail is at a neutral potential, and analog ground is referenced to a power supply negative rail.

The above described circuits thus are exemplary embodiments of a method for detecting arc faults and over-currents in system 10. Such method includes the step of determining a current in a pole conductor using a sensor not in contact with the pole conductor, e.g. using Hall sensor 50 corresponding to conductor L1 and sensor 52 corresponding to conductor L2. Because sensors 50 and 52 do not contact corresponding pole conductors 26, sensor circuits 32 and 34 receive very little spurious signal. Thus tripping caused by spurious signals is reduced or eliminated.

While the invention has been described in terms of various specific embodiments, those skilled in the art will recognize that the invention can be practiced with modification within the spirit and scope of the claims.

What is claimed is:

1. A method for detecting arc faults and over-currents in a circuit, said method comprising:
   determining a current in a first pole conductor using a first over-current detection circuit not in contact with the first pole conductor;
   determining a current in a second pole conductor using a second over-current detection circuit not in contact with the second pole conductor; and
   determining a ground fault between at least one of the first pole conductor and a neutral conductor and the second pole conductor and the neutral conductor using a ground fault detection circuit including a transformer surrounding the first pole conductor, the second pole conductor, and the neutral conductor.

2. A method in accordance with claim 1 wherein said step of powering a ground fault circuit and two over-current detection circuits comprises the step of using a half-wave bridge power supply.

3. A method in accordance with claim 1 wherein said determining a current in a first pole conductor using a first over-current detection circuit not in contact with the first pole conductor comprises determining a current in a first pole conductor using a first Hall Effect Sensor, said determining a current in a second pole conductor using a second over-current detection circuit not in contact with the second pole conductor comprises determining a current in a second pole conductor using a second Hall Effect Sensor.

4. A method in accordance with claim 1 further comprising powering the ground fault circuit, the first over-current detection circuit, and the second over-current detection circuit using a single power supply.

5. A method in accordance with claim 1 further comprising actuating a trip device when an over-current is sensed by at least one of the first over-current detection circuit, the second over-current detection circuit, and the ground fault detection circuit.

6. A method in accordance with claim 1 wherein said step of powering a ground fault circuit and two over-current detection circuits comprises the step of using a full-wave power supply.

7. A method in accordance with claim 6 wherein said step of using a full-wave power supply comprises using a full-wave bridge power supply.

8. A method in accordance with claim 1 further comprising the step of referencing the ground fault circuit and over-current detection circuits to a single ground.

9. A method in accordance with claim 8 wherein the single ground is at a potential of a neutral line conductor.

10. A circuit for detecting arc faults and over-currents in a system, said circuit comprising:
    a first over-current detection circuit not in contact with a first pole conductor configured to determine a current in a said first pole conductor;
    a second over-current detection circuit not in contact with a second pole conductor configured to determine a current in a said second pole conductor; and
    a ground fault detection circuit comprising a current transformer, wherein said current transformer is surrounding said first pole conductor, said second pole conductor, and a neutral conductor.

11. A circuit in accordance with claim 10 wherein said single power supply comprises a half-wave bridge power supply.

12. A circuit in accordance with claim 10 further comprising a single power supply electrically connected to said first over-current detection circuit, said second over-current detection circuit and said ground fault detection circuit.

13. A circuit in accordance with claim 10 wherein said single power supply comprises a full-wave power supply.

14. A circuit in accordance with claim 13 wherein said full-wave power supply comprises a full-wave bridge power supply.

15. A circuit in accordance with claim 10 wherein said first over-current detection circuit comprises a first Hall Effect Sensor electrically connected to a first operational amplifier, said second over-current detection circuit comprises a second Hall Effect Sensor electrically connected to a second operational amplifier, and said ground fault detection circuit comprises a sensor electrically connected to a third operational amplifier.

16. A circuit in accordance with claim 15 further comprising a trip device electrically connected to said first operational amplifier, said second operational amplifier, and said third operational amplifier.

17. A circuit in accordance with claim 10 further comprising a single ground to which said ground fault circuit and said over-current detection circuits are referenced.

18. A circuit in accordance with claim 17 wherein said single ground is at a potential of a neutral line conductor.

19. A circuit in accordance with claim 17 wherein said single power supply comprises a half-wave bridge power supply further comprising positive and negative rails, said positive rail configured at a neutral potential, said single ground configured at a potential of said negative rail.

* * * * *